Sept. 23, 1941.  J. KOPCZYNSKI  2,256,570
TRACTION DEVICE
Filed Oct. 17, 1940  2 Sheets-Sheet 1
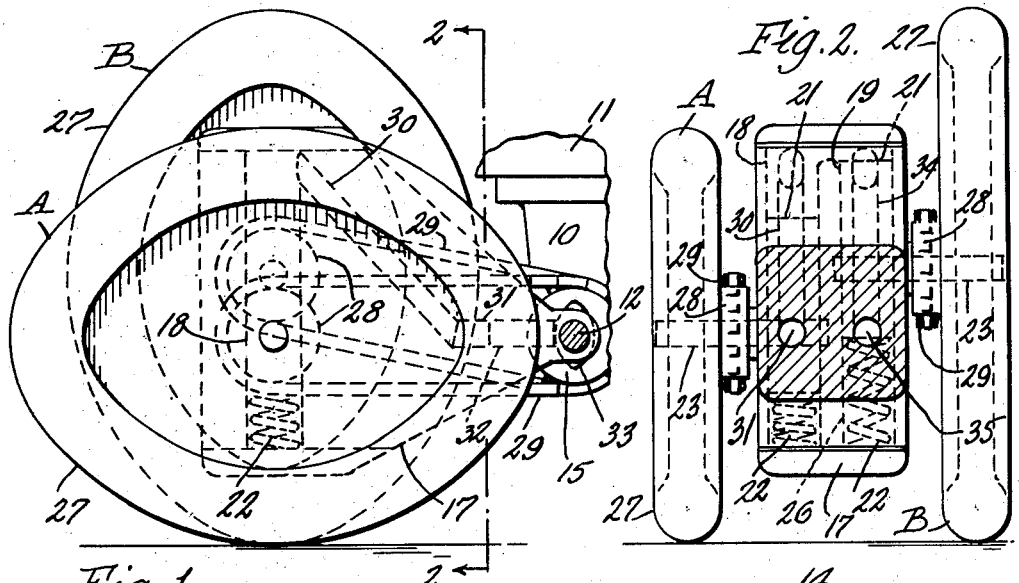
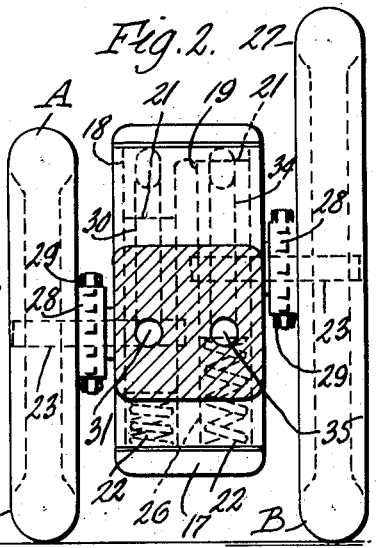
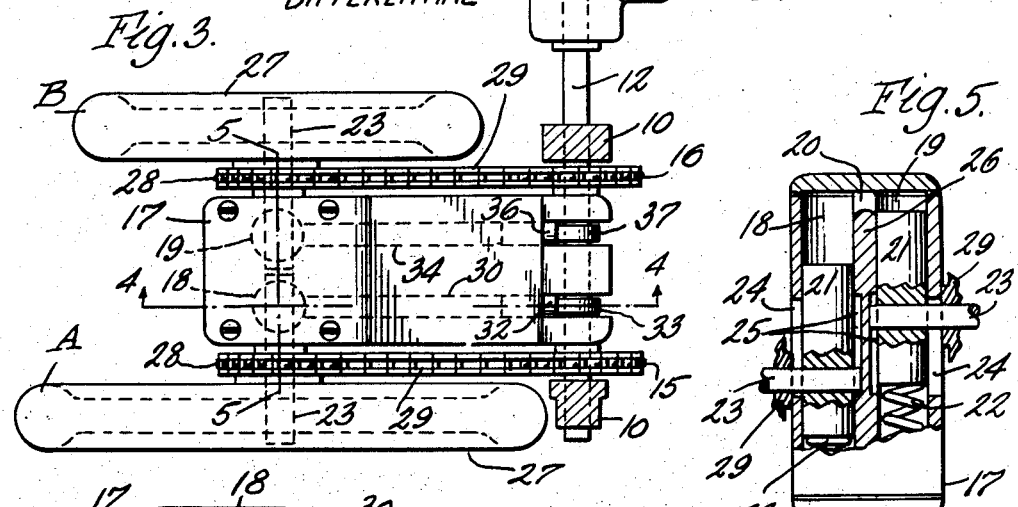
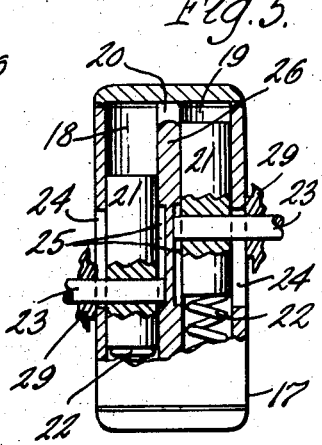
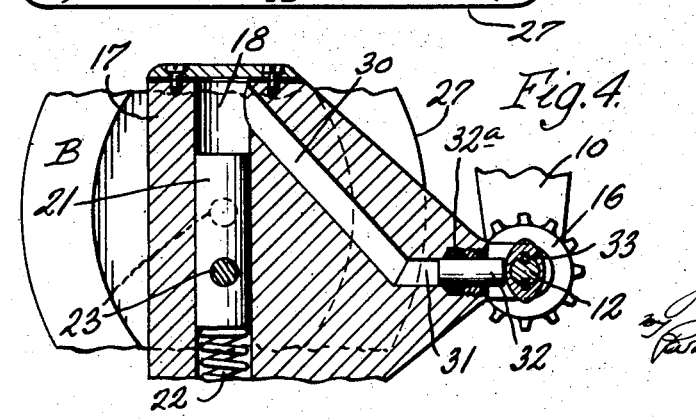
INVENTOR.
John Kopczynski
Parker, Rockwood & Farmer.
ATTORNEYS.

Sept. 23, 1941.   J. KOPCZYNSKI   2,256,570
TRACTION DEVICE
Filed Oct. 17, 1940   2 Sheets-Sheet 2

INVENTOR.
John Kopczynski
by Parker, Rockwood & Farmer
ATTORNEYS.

Patented Sept. 23, 1941

2,256,570

UNITED STATES PATENT OFFICE 2,256,570

TRACTION DEVICE

John Kopczynski, Buffalo, N. Y., assignor of one-half to Dr. Phillip Ament, Buffalo, N. Y.

Application October 17, 1940, Serial No. 361,520

9 Claims. (Cl. 180—7)

This invention relates to traction devices such as may be employed, for example, in the motor propulsion of vehicles. Heretofore it has been recognized that by increasing the diameter of a driving wheel, one may increase the driving traction and the effective area of contact between the wheel and the ground, with less sinking in of the wheel when engaging soft ground. An increase in size of the wheel, however, is not always practical because it places the body of the vehicle too high, and the present tendency is to make the diameter of the wheels as small as possible, notwithstanding the lessened driving traction between the wheel and the ground, in order to lower the center of gravity of the vehicle and its load with respect to the ground.

An object of this invention is to provide an improved driving traction device for vehicles which will have the advantages of small diameter wheels and greater traction or driving power as applied to the ground, even in soft ground; which may be operated at high speeds without undue vertical movements of the vehicle body, and which will be relatively simple, effective, compact and inexpensive.

Another object of the invention is to provide an improved traction device for power propelled vehicles which will have maximum traction on soft as well as hard ground, which will enable relatively close clearance with the ground; and which will operate smoothly at different speeds, and even at high speeds.

Various other objects and advantages will be apparent from the following description of an embodiment of the invention, and the novel features will be particularly pointed out hereinafter in connection with the appended claims.

In the accompanying drawings:

Fig. 1 is a side elevation of a traction device constructed in accordance with this invention, and showing its application to one side of a vehicle which it is to drive;

Fig. 2 is a transverse, sectional elevation of the same, the section being taken approximately along the line 2—2, of Fig. 1;

Fig. 3 is a sectional plan of the vehicle at this device;

Fig. 4 is a vertical, sectional elevation of the same, the section being taken approximately along the line 4—4 of Fig. 3;

Fig. 5 is a sectional elevation through another part of the same, the section being taken approximately along the line 5—5 of Fig. 3.

Figure 6:
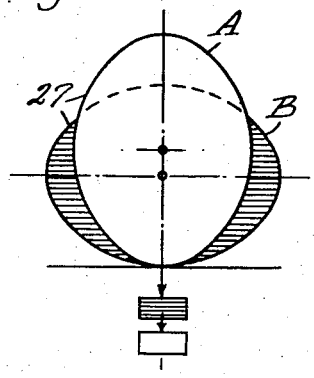
Figs. 6 to 12 inclusive are diagrams, illustrating the action of this improved traction device, and the similarity of its drive to a walking action.

In the embodiment of the invention illustrated in the drawings, and referring particularly to Figs. 1–5, the traction device represents one of the rear driving wheels of a motor vehicle. Bearings 10 depend from the vehicle frame 11 at opposite sides of the vehicle, there being preferably two for each side of the vehicle, as shown in Fig. 3. An approximately horizontal driving or countershaft 12, which is connected through a differential gear device 13 to an engine drive shaft 14, is mounted in the bearings 10. The bearings 10 at each side of the vehicle are spaced apart along the shaft 12, and between them a pair of sprocket wheels 15 and 16 are fixed on shaft 12. Also mounted to oscillate about the axis of the shaft 12 is a member or frame 17, which extends laterally from the shaft 12 in an approximately horizontal direction.

This frame 17 is provided, adjacent its free end, with a pair of downwardly opening cylinders 18 and 19, which are closed at their upper or inner ends, except for a passage 20 between them. A piston 21 is disposed in each of said cylinders 18 and 19, so as to reciprocate somewhat vertically therein. Helical compression springs 22 are disposed in the bottom part of the frame in alinement with the cylinders 18 and 19 and they are compressed between the bottom of the frame and the pistons 21 so as to yieldingly and resiliently urge the pistons 21 upwardly toward the inner or closed ends of the cylinders 18 and 19. Each piston carries a pin or bearing axle 23 which projects laterally therefrom and through a side of the frame 17, it being understood that the outside faces of the frame 17 are provided with vertically extending slots 24 through which the axles 23 may extend and along which they may slide as the axles 23 move vertically with the pistons 21.

The inner ends of the axles 23 are slidingly received in the vertical extending slots or grooves 25 in a partition wall 26 disposed between the cylinders 18 and 19, so that each pair of the slots 24 and 25 resists lateral movement of the axle 23 that is guided thereby. A traction wheel 27 is mounted on the outer or free end of each axle 23, and thus the two wheels 27 of each traction device, which may also be individually designated A and B, are supported for individual rotation upon the pistons 21, and also are capable of individual vertical movement toward and from the ground with those pistons, and both wheels with the frame 17 may be moved bodily in a vertical direction. Such vertical movement of the pair of wheels 27 and the frame 17 as a unit is resiliently opposed by any suitable spring device (not shown) common in vehicles. Each wheel is provided on its face toward the frame 17 with a sprocket wheel 28, and sprocket chains 29 drivingly connect the sprocket wheels 15 and 16 of shaft 12 with the sprocket wheels 28 that are fixed to the traction wheels 27.

Each of the wheels 27 has its ground-engaging periphery of oblate circular form, which preferably somewhat closely approximates an ellipse, as shown in Fig. 1, and the longitudinal axes of the ground-engaging peripheries of these two wheels 27 are disposed substantially crosswise of one another in different but approximately parallel planes, as shown in Fig. 1. In other words, the driving connection between the wheels 27 and the shaft 12 is a mechanical drive, and the wheels 27 maintain their synchronism to one another throughout the driving action, so that the major or longer axes of the oblate forms of the ground-engaging peripheries retain their angular relationship at all times. Inasmuch as the inner ends of the cylinders 18 and 19 are closed, except for the passage 20 between them, it will be understood that when the cylinders 18 and 19 are filled with a fluid, such as an oil, and either piston 21 moves upwardly or towards its inner end, it will displace a quantity of such oil or fluid through the passage 20 into the other cylinder, and force that cylinder down to the same extent as the upward movement of the other piston. Thus, when one piston moves upwardly in the frame 17, it forces the other piston downwardly by approximately the same amount.

With a device such as just described, it will be understood that when the wheel 27A is disposed in a position with its longer axis horizontal, the longer axis of the wheel 27B will be vertical. The wheel A, because of the long, easy curvature or arc of its surface (for example, a relatively large radius of curvature in considering the periphery of the wheel) where it engages the ground will provide a relatively large area of contact between the wheel and the ground, which prevents the wheel from sinking into the ground, if it happens to be soft, and gives greater contact area and therefore greater driving traction regardless of the character of the ground. Inasmuch as the wheel B at this time rests on its end, it will have a lesser area of contact, but the area of its contact with the ground will be side by side with the area or zone of contact between the wheel A and the ground. When the shaft or axle 12 rotates, it will rotate the wheels 27 (A and B) in synchronism with one another, during which the wheel A will roll upon one end, and at the same time the wheel B will roll over upon its broad arcuate portion, or just the reverse of that shown in Figs. 1, 2 and 3.

As the wheel A rolls upon its end from the position shown in Fig. 1, it will shift its piston 21 upwardly and, by displacing fluid through the passage 20, will force the other piston 21 downwardly, so as to cause the wheel B to maintain contact with the ground, even though the broad portion of the periphery is nearer the axis of rotation of the wheel. By reason of the sprocket chain connection from the wheels to the axle or shaft 12 on which the frame oscillates, this driving connection between the wheels and shaft 12 will continue as the wheels rotate and yet move vertically relatively to one another or vertically with the frame 17 as a unit. Because of this relationship, both wheels A and B on each traction device will always remain in contact with the ground, even though the device is being propelled rapidly over the ground, and even though the ground is irregular or rough.

If there is not sufficient correlation between the peripheries of the wheels A and B, when the wheel A tends to roll upon an end, the wheel B may not descend at exactly the exact proportionate amount to maintain contact with the ground. Accordingly, I have provided a compensating device which may be used and which will now be described. From the upper end of the cylinder 18, I provide a passage 30 which leads downwardly and forwardly generally towards the axle or shaft 12 and then forwardly in a direction radially towards the shaft 12, as at 31. The passage 31 terminates a short distance in front of the shaft 12, and in this end of the passage I mount a reciprocating plunger 32. A packing gland 32a is provided for the plunger 32 which effectively prevents leakage of any fluid from the passages 30 and 31 along the plunger 32 without greatly resisting movement of the plunger 32. Immediately in front of the plunger 32, I fix on the shaft 12 a cam 33, and its periphery engages with the end of the plunger 32, so that as the shaft 12 rotates and drives the wheels 27 of the traction device, this cam will vary the position of the plunger 32, and thus control the amount of fluid displaced by the related piston 21 in the cylinder 18 which forces the other piston 21 downwardly.

Similarly, another duct 34, Fig. 3 extends from the upper or closed end of the cylinder 19 downwardly and forwardly, and terminates in a passage 35 which extends radially of the shaft 12. A plunger 36 similar to plunger 32 is disposed in the passage 35. A cam 37 similar to the cam 33 is also fixed on the shaft 12 in alinement with the plunger 36, so that as the shaft 12 rotates to drive the wheels 27, the cam 33 will cause a variation in the chamber or space into which fluid may be displaced by the upward movement of the piston 21 in the cylinder 19, and hence the extent of downward displacement of the other piston 21 in cylinder 18. The shapes of the cams 33 and 37 are computed empirically or by trial, and these shapes will vary with variations in the shapes of the wheels 27. By properly selecting or designing the cams 33 and 37, one is able to obtain a very smooth movement of the traction device over the ground with a minimum of vertical movement of the wheels 27 and frame 17 as a unit. Pressure of the wheels 27 on the ground, which thus provides for traction, is obtained through the frame 17 from the vehicle frame by the usual or any suitable spring support (not shown).

Referring now to Figs. 6 to 12, I have illustrated diagrammatically, the manner in which the two wheels 27 having oblate circular ground-engaging peripheries perform what I have termed a "walking action." In the series of diagrams, Figs. 6 to 12, the wheel B in each of the successive figures is shaded so that it can be distinguished readily from the wheel A, which is unshaded, and the relative positions of contact of the wheels with the ground in the direction of travel are shown by the small rectangles below each figure. The position of contact of the wheel B with the ground is shown in each figure by the shaded rectangle.

It is well known that with the ordinary circular wheel, whenever the wheel slips, there is a spinning of the wheel or slippage of the wheel on the ground, but where the periphery of the wheel is non-circular, such as oblate circular, the rotation of the wheel will tend to roll it end upon end over the ground. The small ends will tend to bite into the ground and give traction, and the large or broad faces of the wheels will give large areas of traction contact. As these areas move during the rolling action, there is not only the traction produced between the wheels and the ground, but also a sort of walking action. For example, in Fig. 6, the wheel A is shown as standing on end and wheel B is in the position with its long axis horizontal and crosswise of the long axis of the wheel A. Both rectangles are side by side, which represents the position of two feet of a person when standing perfectly still.

Figure 7:
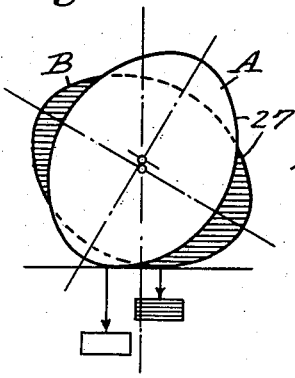
Figure 8:
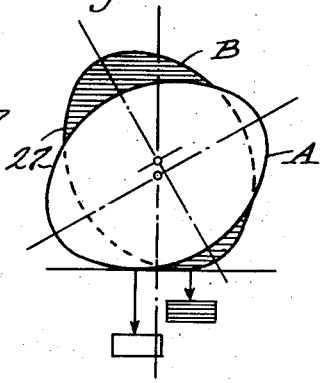

If now rotation of these wheels A and B in a clockwise direction occurs, the wheel A will roll over upon its broad side and the wheel B will roll upon its end, and it will be noticed that while the area of contact between wheel A and the ground is moved forwardly slightly, due to the natural roll of the wheel, the area of contact between the wheel B and the ground, as shown by the shaded rectangle in Fig. 7, has moved forwardly much more rapidly, which corresponds to the movement of the left foot of a person walking forwardly. Then, as the rotation continues, the contact zone of wheel A will also move forwardly more rapidly than does the area of contact between wheel B and the ground, so that there will still be a difference in advance positions of the two rectangles and, consequently, of the areas of contact of the wheels with the ground. This is shown in Fig. 8.

Figure 9:
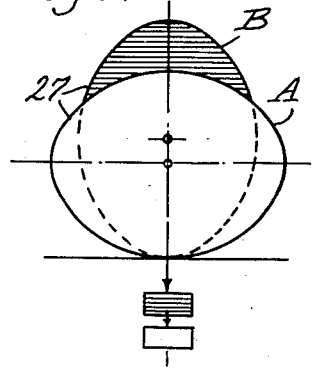
Figure 10:
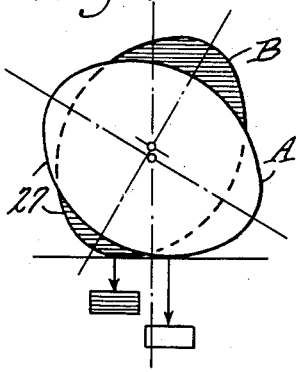
Figure 11:
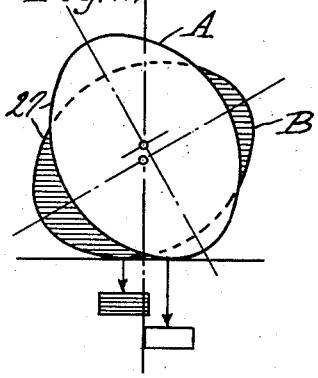
Figure 12:
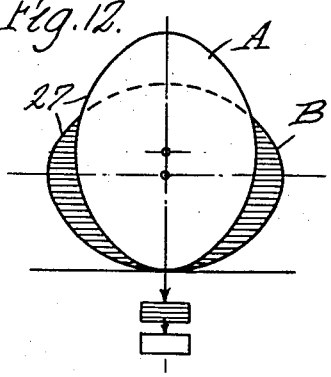

During further rotation, the wheel A will move entirely over upon its broad side and the wheel B will be on end, as shown in Fig. 9, in which case the two areas of contact are again side by side, just as though a person while rolling along on roller skates had stepped forwardly first with the left foot and then brought the right foot up into a position alongside the left one. During continued rotation of the wheels in the same direction, the area of contact between the wheel A and the ground will move forwardly more rapidly than that of wheel B, as shown in Fig. 10 by the relative positions of the rectangles, and as this continues, relative positions are taken as shown in Fig. 11, during which the area of contact of the wheel B is gaining on the area of contact of wheel A. When the parts reach the positions shown in Fig. 12, a half revolution beyond the same position shown in Fig. 6, we find that the areas of contact are again side by side, just as though in a movement from Fig. 9 to Fig. 12, one has swung the right foot forwardly first into the position shown in Fig. 10 and then pulled the left foot forwardly into the position along side of the right foot as in Fig. 12.

Thus, it will be clear that not only is there the ordinary driving traction which one finds between any rotating wheel and the ground, but there is this additional driving or progressive action in which the areas of contact between the wheels and the ground advance at different rates, as illustrated by analogy with a walking person. This gives maximum possible areas of contact between the wheels as well as the walking action, yet the axles of the wheels are at all times close to the ground thereby enabling the vehicle body to be kept close to the ground. As each wheel moves upwardly, due to its somewhat elliptical shape, it forces the other wheel downwardly a proportionate amount, and thus both wheels are at all times kept on the ground for driving action thereon.

A traction device of this type is particularly useful in connection with vehicles that operate over soft or irregular ground, and yet it may be operated on rough or uneven ground as well as on smooth roads at a relatively high rate of speed without producing an objectional, vertical bumping of the vehicle body. Such an arrangement is very useful in connection with armored vehicles and tanks used by military forces, and may also be used on trucks for industrial purposes, where they may be driven over many different kinds of grounds and highways.

It will be understood that various changes in the details and arrangements of parts which have been herein described and illustrated in order to explain the nature of the invention, may be made by those skilled in the art within the principle and scope of the invention as expressed in the appended claims. It will also be understood that while a driving chain connection has been shown as provided between the shaft 12 and the wheels, other mechanical drives between them may also be substituted therefor provided they allow independent vertical movements of the wheels while retaining their driving connections to the shaft 12.

I claim as my invention:

1. An improved traction device for vehicles comprising a pair of wheels disposed side by side, an individual support on which each wheel is rotatably mounted, a driving member, means mechanically connecting said member with each of said wheels to rotate the latter, means mounting each of said supports for individual vertical movement while said wheels remain connected to said member to be driven thereby, means operable by an individual upward movement of each of said supports for causing a simultaneous downward movement of the other of said supports, each of said wheels having its ground-engaging periphery of oblate circular shape, with the longer axes of said wheels extending in directions crosswise of one another in parallel planes.

2. An improved traction device for vehicles comprising a pair of wheels disposed side by side, an individual support on which each wheel is rotatably mounted, a driving member, means mechanically connecting said member with each of said wheels to rotate the latter, means mounting each of said supports for individual vertical movement while said wheels remain connected to said member to be driven thereby, fluid actuated means operable by an individual upward movement of each of said supports for causing a simultaneous downward movement of the other of said supports, each of said wheels having its ground engaging periphery of oblate circular shape, with the longer axes of said wheels extending in directions crosswise of one another in parallel planes.

3. An improved traction device for vehicles comprising an approximately horizontal driving shaft, a frame hinged on said shaft for vertical swinging movement thereon, said frame having a pair of downwardly opening cylinders communicating with one another at their closed ends; a piston reciprocating in each cylinder and having a laterally extending wheel support, with said supports extending from said frame in opposite directions, a hydraulic operating fluid in the communicating portions of said cylinders, a wheel rotatably mounted on each support for individual vertical movement with the piston carrying that support, and means for mechanically driving each wheel from said shaft as that wheel swings vertically with said frame and moves vertically with its supporting piston, each of said wheels having its ground-engaging periphery of substantially oblate circular shape, with the longer axes of said wheel peripheries extending in directions crosswise of one another in parallel planes.

4. An improved traction device for vehicles comprising an approximately horizontal driving shaft, a frame hinged on said shaft for vertical swinging movement thereon, said frame having a pair of downwardly opening cylinders communicating with one another at their closed ends, a piston reciprocating in each cylinder and having a wheel support extending from said frame, a hydraulic operating fluid in communicating portions of said cylinders, a wheel rotatably mounted on each support for individual vertical movement with the piston carrying that support, means for mechanically driving each wheel from said shaft as that wheel swings vertically with said frame and moves vertically with its supporting piston, and means resiliently and individually urging each of said pistons towards the inner end of its said cylinder, each of said wheels having its ground-engaging periphery of approximately oblate circular shape, with the longer axes of said wheel peripheries extending in directions crosswise of one another in parallel planes.

5. An improved traction device for vehicles comprising an approximately horizontal driving shaft, a frame hinged on said shaft for vertical swinging movement thereon, said frame having a pair of downwardly opening cylinders communicating with one another at their closed ends, a piston reciprocating in each cylinder and having a laterally extending wheel support, with said supports extending in opposite directions from said frame, a hydraulic operating fluid in the communicating portions of said cylinders, a wheel rotatably mounted on each support for individual vertical movement with the piston carrying that support, means for mechanically driving each wheel from said shaft as that wheel swings vertically with said frame and moves vertically with its supporting piston, each of said wheels having its ground-engaging periphery of approximately oblate circular shape, with the longer axes of said wheel peripheries extending in directions crosswise of one another in parallel planes, said frame having a duct leading from said communicating portions of said cylinders and means for varying the capacity of said duct automatically in different angular positions of said shaft in accordance with a predetermined plan.

6. An improved traction device for vehicles comprising an approximately horizontal driving shaft, a frame hinged on said shaft for vertical swinging movement thereon, said frame having a pair of downwardly opening cylinders communicating with one another at their closed ends, a piston reciprocating in each cylinder and having a laterally extending wheel support, with said supports extending in opposite directions from said frame, a hydraulic operating fluid in the communicating portions of said cylinders, a wheel rotatably mounted on each support for individual vertical movement with the piston carrying that support, means for mechanically driving each wheel from said shaft as that wheel swings vertically with said frame and moves vertically with its supporting piston, each of said wheels having its ground-engaging periphery of approximately oblate circular shape, with the longer axes of said wheel peripheries extending in directions crosswise of one another in parallel planes, said frame having a duct leading from said communicating cylinders, a plunger reciprocating into and out of said duct to vary the capacity of that duct, and cam means operated by said shaft and in turn operable on said plunger to force it into said duct and release it as said shaft revolves according to a predetermined plan.

7. An improved traction device for vehicles comprising an approximately horizontal driving shaft, a frame mounted for vertical swinging movement about the axis of said shaft, a pair of wheels disposed side by side on opposite sides of said frame, means carried by said frame and projecting laterally therefrom on opposite sides and mounting said wheels for independent vertical movement relatively to said frame, means interacting between said wheel mounting means and operable upon movement of either wheel mounting in a direction away from the ground on which the wheels rest for forcing simultaneously the other of said wheel mountings toward the ground, and means for mechanically driving said wheels from said shaft, each of said wheels having its ground-engaging periphery of oblate circular shape, with the longer axes of said wheel peripheries extending in directions crosswise of one another in approximately parallel planes.

8. An improved traction device for vehicles comprising a driving shaft, a pair of wheels disposed side by side, means mounting each of said wheels for rotation and for individual generally vertical bodily movements, means drivingly connecting each of said wheels to said shaft, so as to be rotated thereby in synchronized relation to one another, and means interacting between said wheel mounting means and operable automatically whenever either of said wheel mounting means moves in a direction away from the ground on which the wheels rest for causing a simultaneous movement of the other wheel mounting means in a direction towards said ground, each of said wheels having its ground engaging periphery of oblate circular shape, with the longer axes of said wheel peripheries extending in directions generally crosswise of one another in approximately parallel planes.

9. An improved traction device for vehicles comprising a driving shaft, a pair of wheels disposed adjacent one another, means mounting each of said wheels for rotation, means drivingly connecting each of said wheels to said shaft, so as to be rotated thereby in synchronized relation to one another, and means interacting between said wheel mounting means and operable automatically whenever either of said wheel mounting means moves in a direction away from the ground on which the wheels rest for urging the other wheel mounting means in a direction towards said ground, each of said wheels having its ground engaging periphery of oblate circular shape, with the longer axes of said wheel peripheries extending in directions generally crosswise of one another in approximately parallel planes.

JOHN KOPCZYNSKI.